US006823089B1

(12) United States Patent
Yu et al.

(10) Patent No.: US 6,823,089 B1
(45) Date of Patent: Nov. 23, 2004

(54) METHOD OF DETERMINING THE EXTENT OF BLOCKING AND CONTOURING ARTIFACTS IN A DIGITAL IMAGE

(75) Inventors: Qing Yu, Rochester, NY (US); Jiebo Luo, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 967 days.

(21) Appl. No.: 09/672,658

(22) Filed: Sep. 28, 2000

(51) Int. Cl.[7] .................................................. G06K 9/40
(52) U.S. Cl. ........................ 382/268; 382/194; 382/199; 382/275
(58) Field of Search ................................. 382/268, 250, 382/266, 251, 199, 194, 190, 267, 200, 220, 263, 243, 254, 272–275; 348/606–624, 252; 358/1.9, 3.31, 447, 461, 463

(56) References Cited

U.S. PATENT DOCUMENTS

| | | | | |
|---|---|---|---|---|
| 4,196,454 | A | * | 4/1980 | Warren ....................... 358/3.22 |
| 5,651,078 | A | * | 7/1997 | Chan .......................... 382/261 |
| 5,793,428 | A | * | 8/1998 | Coelho .................. 375/240.13 |
| 5,956,430 | A | * | 9/1999 | Kunitake et al. ........... 382/246 |
| 6,411,741 | B1 | * | 6/2002 | Hamamura et al. ......... 382/254 |
| 6,512,855 | B1 | * | 1/2003 | Delean ....................... 382/276 |
| 6,522,427 | B1 | * | 2/2003 | Bhattacharjya et al. ...... 358/1.9 |
| 6,532,306 | B1 | * | 3/2003 | Boon et al. ................. 382/232 |
| 6,563,537 | B1 | * | 5/2003 | Kawamura et al. ......... 348/252 |
| 6,643,410 | B1 | * | 11/2003 | Yu et al. ...................... 382/268 |

OTHER PUBLICATIONS

A triage method of determining the extent of JPEG compression artifacts, ICCP, by Luo et al., IEEE 2002, pp. 473–476.*

"Reduction of Blocking Effect in Image Code" by Howard C. Reeve, III and Jae S. Lim. ICASSP, pp. 1212–1215, 1983.

U.S. patent application Ser. No. 09/606,266, Qing Yu et al., filed Jun. 29, 2000.

* cited by examiner

Primary Examiner—Vikkram Bali
(74) Attorney, Agent, or Firm—David M. Woods

(57) ABSTRACT

A digital image processing determining the extent of blocking and contouring artifacts in a digital image includes the steps of: determining the extent of blocking artifacts using the column and row difference arrays; determining the extent of contouring artifacts based on an estimated DC quantization step size; and, determining a composite artifact measure as a function of the extent of blocking artifacts and extent of contouring artifacts. A digital image processing method determining the extent of contouring artifacts in the digital image includes the steps of: forming a column difference image; averaging the values in the columns in the column difference image to produce a column difference array; computing the average of the values in the column difference array that are separated by one block width to produce a block averaged column difference array; locating the peak value in the block averaged column difference array; repeating the above mentioned steps in the row direction; locating block boundaries based on the locations of peak values of column and row difference arrays; calculating DC value for each block; generating a histogram of the block DC values; calculating the Fourier transform of the histogram; locating the first non-DC peak in the Fourier transform domain; calculating a DC quantization step size based on the frequency of the first non-DC peak; and, employing the DC quantization step size as a measure of the extent of the contouring artifacts in the digital image.

12 Claims, 4 Drawing Sheets

METHOD OF DETERMINING THE EXTENT OF BLOCKING AND CONTOURING ARTIFACTS IN A DIGITAL IMAGE

CROSS REFERENCE TO RELATED APPLICATIONS

Reference is made to commonly assigned U.S. patent application Ser. No. 09/606,266, entitled "A Method of Determining the Extent of Blocking artifacts in a Digital Image", which was filed on Jun. 29, 2000, the disclosure of which is incorporated herein by reference.

FIELD OF THE INVENTION

This invention relates to the field of digital image processing, and ore particularly to methods of determining the extent of blocking and contouring artifacts in a digital image.

BACKGROUND OF THE INVENTION

Digital images contain enormous amounts of data. Storage of this type of data on digital media is generally expensive and transmission of digital images requires either a large bandwidth or a long period of time. Many algorithms have been developed to compress image data by removing visually redundant information from the image. Discrete-cosine-transform-based (DCT-based) compression has been the most popular among existing techniques. DCT has very good energy compaction and data decorrelation properties. Moreover, DCT can be computed using fast algorithms and efficiently implemented using very large scale integration (VLSI) techniques. In DCT-based coding, an image is partitioned into small square blocks (typically 8×8) and DCT is computed over these blocks to remove the local spatial correlation. In order to achieve high compression, quantization of the DCT coefficients is then performed. Quantization is an irreversible process that causes loss of information and distortions in the decompressed image. After quantization, the redundancy in the data is further reduced using entropy coding. At the decoder end, the received data is decoded, dequantized, and reconstructed by the inverse DCT. In general, a typical 8-bit gray-level image can be coded with compression ratio up to 10:1 without noticeable artifacts.

However, at low bit rates the reconstructed images generally suffer from visually annoying artifacts as a result of very coarse quantization. One major such artifact is the blocking effect, which appears as artificial block boundaries between adjacent blocks. At a low bit rate, each block is represented mainly by the first few low-frequency coefficients and, since each block is processed independently, no interblock correlation is accounted for in standard block DCT-based coding schemes. Therefore, discontinuity across the block boundary becomes noticeable.

There are many techniques developed to reduce the blocking effect. (i.e, H. C. Reeve III and J. S. Lim, "Reduction of blocking effect in image coding," in ICASSP, pp. 1212–1215, 1983). Since most of these techniques employ some kind of image filtering technique and thus reduce image sharpness to some extent, it is imperative that these techniques not be used on a "good image," i.e., one that has not been compressed highly enough to exhibit the blocking artifacts. Therefore, it is necessary to develop a triage algorithm that measures the extent of blocking artifacts in a digital image.

Certain blocking artifact removal algorithms require prior knowledge of block boundary locations. However, since digital images compressed with DCT-based technique can be further modified, for example, through cropping and zooming, the block boundary locations may have changed and become unknown at the time of blocking artifact removal. Thus, for those blocking artifact removal algorithms, there is a need for an automatic technique for detecting block boundary locations in digital images having blocking artifacts.

Because digital images may or may not have been compressed, and may have gone through different degrees of compression, the extent of the blocking artifacts varies from nonexistent to visually objectionable. Therefore, There is a need for determining the extent of the blocking artifacts in order to decide whether to perform artifact removing procedures. Furthermore, because virtually all artifact removal algorithms removes blocking artifacts at the expense of image detail, there is a need for controlling the optimal amount of filtering in order to strive for the good trade-off between artifacts removal and image detail preservation.

A conventional method for determining the extent of the blocking artifacts involves taking the ratio between the size of the compressed JPEG file and the size of the image, which corresponds to the amount of uncompressed image data. This ratio is commonly referred to as the compression ratio.

However, the compression ratio is not necessarily a good measure of the quality of the compressed image, nor the extent of the blocking artifacts. In general, at the same compression ratio, a busy image would look worse than a less busy image because busy images are harder to compress (therefore a busy image has lost more details than the less busy image).

Another common artifact due to coarse quantization, in particular the DC coefficients, by JPEG compression, is false contours in smoothly varying image regions. This is actually an extreme case of the blocking facts where block boundaries only appear in one direction. It will be referred to as contouring artifacts in the present invention. For example, if an image contains a smooth sky region and the gradient of transition is in the vertical direction, then false contours will show up in the horizontal direction as horizontal contours when the image is highly compressed with coarse quantization.

Therefore, there is a need to define a more perceptually accurate measure of both the blocking and contouring artifacts.

SUMMARY OF THE INVENTION

The needs are met according to the present invention by providing a digital image processing method for determining the extent of blocking and contouring artifacts in a digital image, that includes the steps of: forming column and row difference images; averaging the values in the columns and rows in the column and row difference images to produce column and row difference arrays; determining the extent of blocking artifacts using the column and row difference arrays; determining the extent of contouring artifacts based on an estimated DC quantization step size; and, determining a composite artifact measure as a function of the extent of blocking artifacts and extent of contouring artifacts. The needs are further met according to the present invention by providing a digital image processing method for determining the extent of contouring artifacts in the digital image, that includes the steps of: forming a column difference image; averaging the values in the columns in the column difference image to produce a column difference array; computing the average of the values in the column difference array that are separated by one block width to produce a block averaged column difference array; locating the peak value in the block averaged column difference array; repeating the above mentioned steps in the row direction; locating block boundaries based on the locations of peak values of column and row difference arrays; calculating DC value for each block; generating a histogram of the block DC values; calculating the Fourier transform of the histogram; locating the first non-DC peak in the Fourier transform domain; calculating a DC quantization step size based on the frequency of the first non-DC peak; and, employing the DC quantization step size as a measure of the extent of the contouring artifacts in the digital image.

ADVANTAGES

The present invention has the advantage that it measures the extent of blocking and contouring artifacts in a digital image based on image content.

The present invention also has the advantage that it automatically detects block boundary locations even if a digital image has been modified by cropping and zooming.

DETAILED DESCRIPTION OF THE INVENTION

The present invention relates to a method for determining the extent of blocking and contouring artifacts in a digital image.

A digital image may be a grayscale image containing the intensity component, or a color image containing RGB components. For color images, a color transform is typically performed before image compression to take advantage of the redundancy in the color perception of the human visual system (HVS). For example, in JPEG compression, a color image is first converted from RGB to YCbCr color space with the following equations:

$Y=16+65.481*R+128.553*G+24.966*B;$ $Cb=128-37.797*R-74.203*G+112*B;$ $Cr=128+112*R-93.786*G-18.214*B;$ where Y is the intensity component, and Cb and Cr are the two chrominance components. R, G and B are all normalized to 1.

Figure 1:
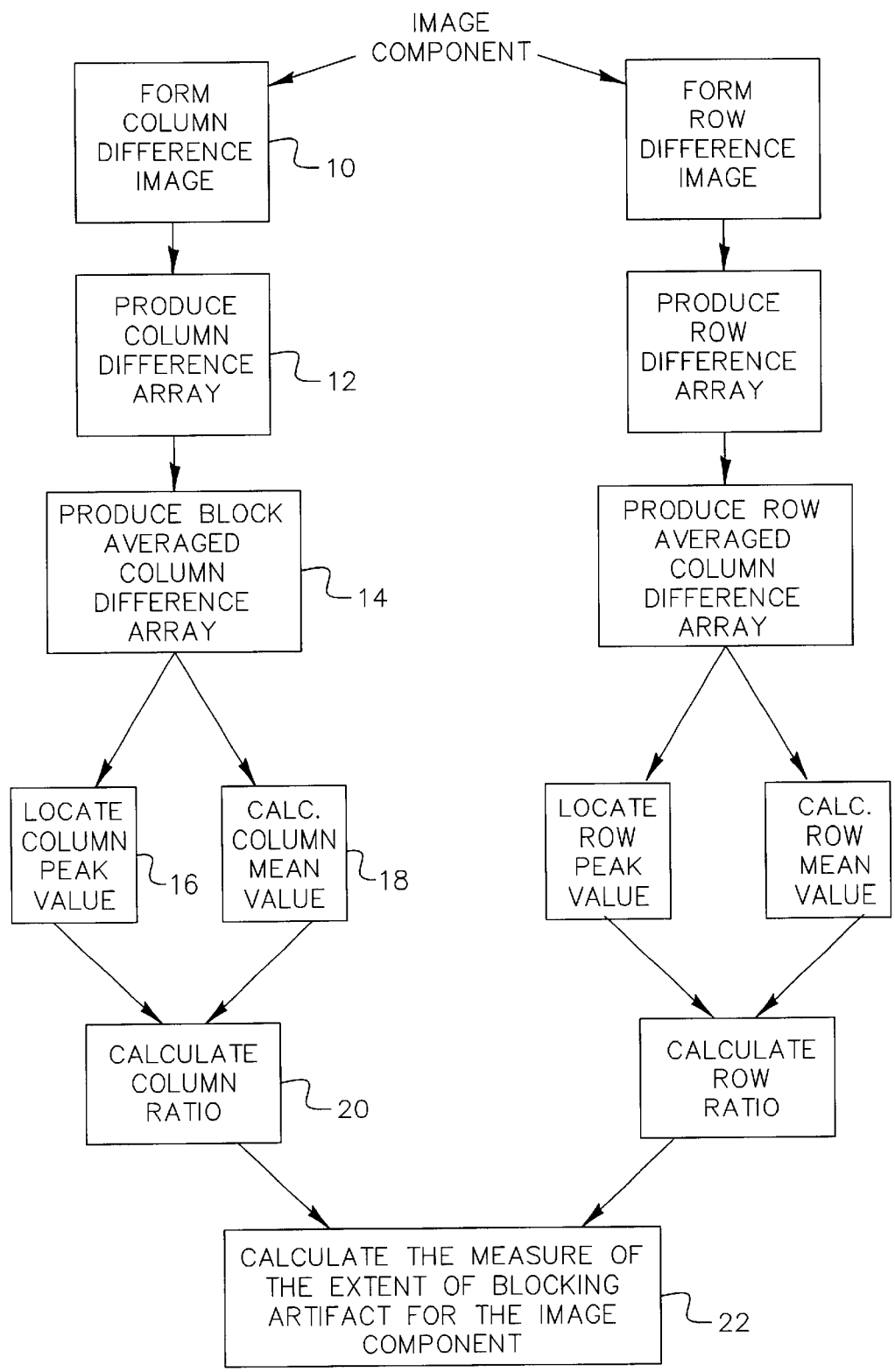
FIG. 1 is a block diagram of one aspect of an embodiment of current invention.

Referring to FIG. 1, for each image component, a column difference image is first generated 10 by calculating the absolute difference between adjacent two columns. For example, subtracting the pixel values of the second column of the image from the pixel values of the first column of the image to generate a column of difference values, and set the pixel values of the first column of the column difference image as the absolute values of the column of difference values. Same procedure is repeated to set the rest of the columns of the column difference image except the last columns where all the values of that column are set to zero.

The column difference image is further averaged in the vertical direction to generate 12 a one-dimensional column difference array, VA. Assume the original image has M rows and N columns of image data, VA should have N entries. To keep image edges from contributing to the detection, the contribution of a pixel in the column difference image is discarded if the magnitude of the intensity gradient of the corresponding pixel in the original image component is larger than a threshold value T. Sobel operators are used as the intensity gradient operators to generate an intensity gradient image with the intensity gradient equals to the sum of the absolute values from the horizontal and vertical Sobel operators. In the current embodiment of the invention, the standard deviation (SD) of the intensity gradient image is calculated, and the threshold value T is set as twice SD.

VA is further averaged using a periodicity of the JPEG block width (8) to generate 14 a block averaged column difference array, VAA, which has eight entries. In other words, every eighth entries of VA will be averaged, and the result will be used to set the eight entries of VAA.

From VAA, the maximum value is first located 16 and defined as the column peak value, then the mean value of VAA is calculated 18 excluding the peak value. The mean value is defined as the column base value. Finally, the ratio between the peak value and base value is calculated to generate 20 a column ratio.

Figure 3:
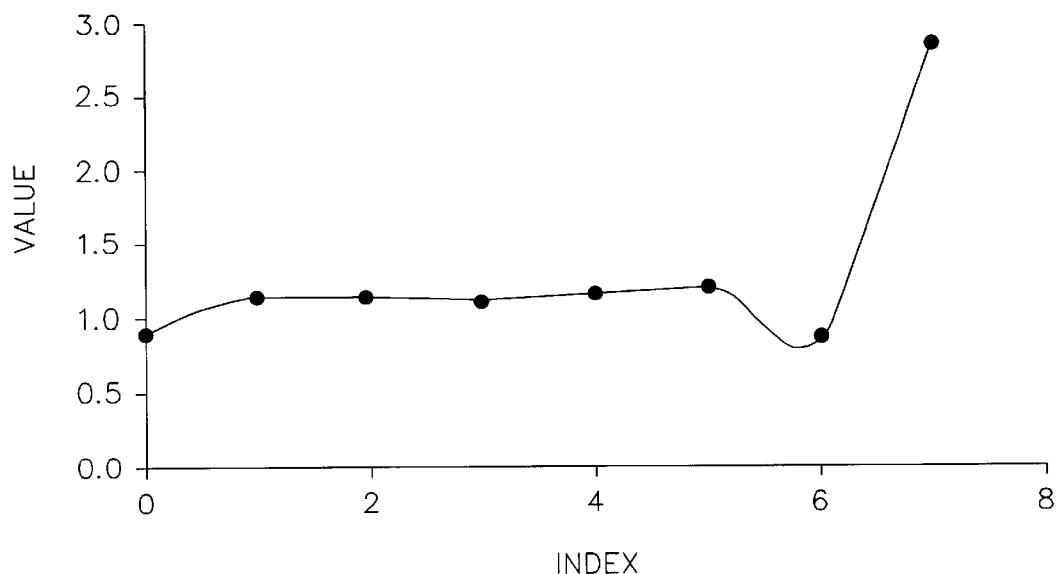
FIG. 3 shows a plot of a typical block averaged difference array.

FIG. 3 shows a typical block averaged difference array with 8 elements (index starts at 0) from a typical digital image. The x-axis is the array index and the y-axis is magnitude. In this case, the peak value (2.62) occurs at index 7, the mean value is 1.03, and the ratio is about 2.6.

Row peak value, row base value and row ratio are also calculated analogously.

The column and row ratios are good indicators of the presence of the blocking artifacts in the column and row directions, respectively. Therefore, a preferred measure 22 for the extent of blocking artifacts of the whole image is the maximum value of the column and row ratios for images with statistically equally distributed horizontal and vertical structures. Alternatively, the measure of the extent of blocking artifacts may be the average of the column and row ratios.

The visibility or objectionability of the blocking artifacts may depend on the actual structure in an image. For example, textured areas tend to hide the blocking artifacts better than flat areas. The column and row base values are good indicators of the amount of textures. To achieve a higher degree of adaptivity to the image content, the measure of the extent of the blocking artifacts can be defined as a function of both the column/row ratios and the column/row base values. In general, the higher the base values, meaning a higher degree of texture activity (capable of hiding a larger extent of blocking artifacts), a higher threshold on the artifact measure should be used. In practice, a look-up-table can be built to quantitatively characterize the relationship between the base values and the threshold.

The indexes of peak value in VAA and HAA (block averaged row difference array) are the JPEG block boundary locations in the horizontal and vertical directions for the image component. For example, if the index for the peak value in VAA is 4, then it is assumed that JPEG block boundary will appear at column no. 4, 12, . . . in the image component. Note that the indexes for the columns of the image component as well as for VAA and HAA start at zero in this embodiment.

In the case where digital images are not only cropped but also zoomed (shrunk or magnified), the block size is no longer the original JPEG block size of 8. For potentially magnified digital images, the above-mentioned process for determining the extent of the JPEG blocking artifacts can be repeated for a predetermined series of hypothetical block width values to produce a series of ratios between the peak value and the base value. The hypothetical block width that produces the maximum artifact measure is chosen to be the effective block size after zooming. The zooming factor is in turn determined to be the ratio between the effective block size and the original block size (i.e., 8).

Since the contouring artifacts in an image are directly related to the degree of quantization of the DC value of each block in the image, an efficient approach to measuring the contouring artifacts in the image is by determining the DC quantization step used by JPEG compression.

Figure 2:
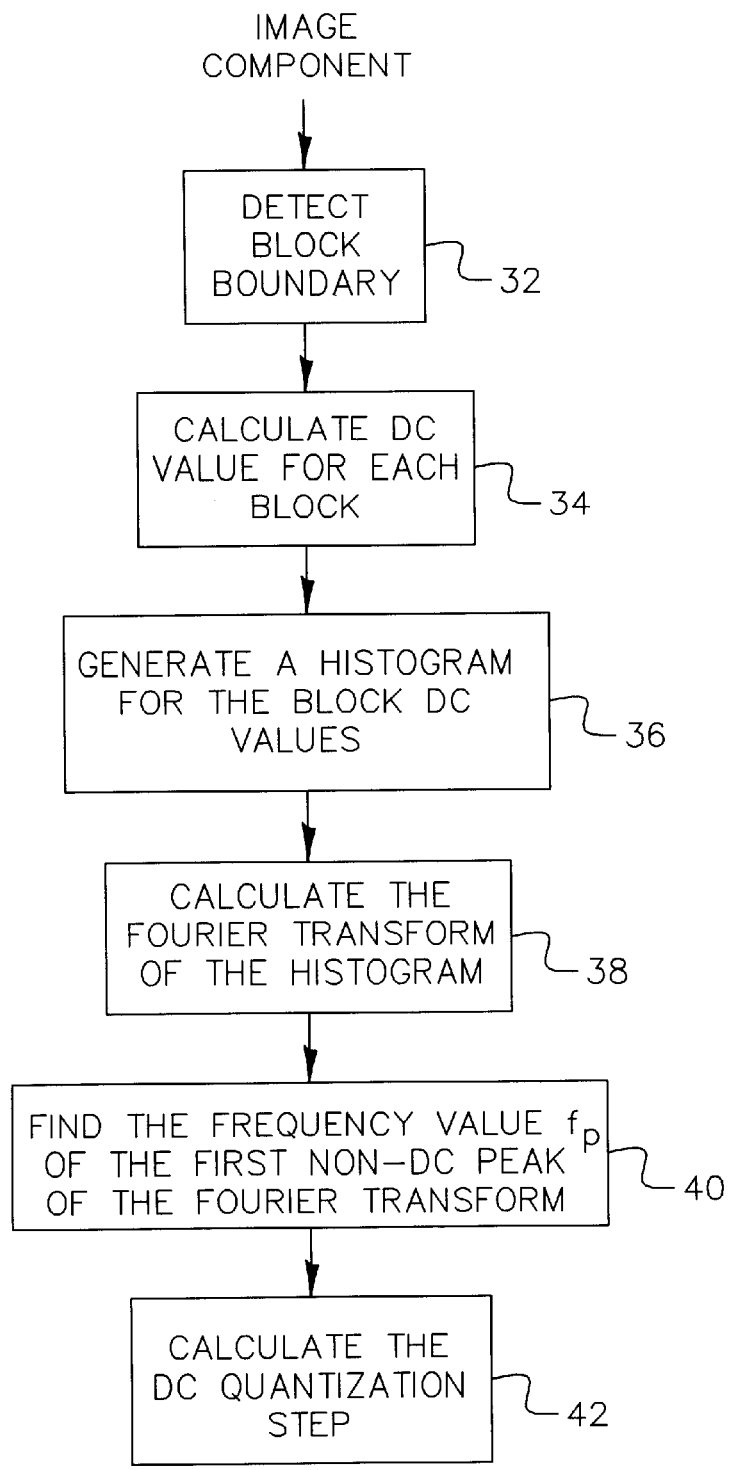
FIG. 2 is a block diagram of another aspect of an embodiment of current invention.
Figure 4:
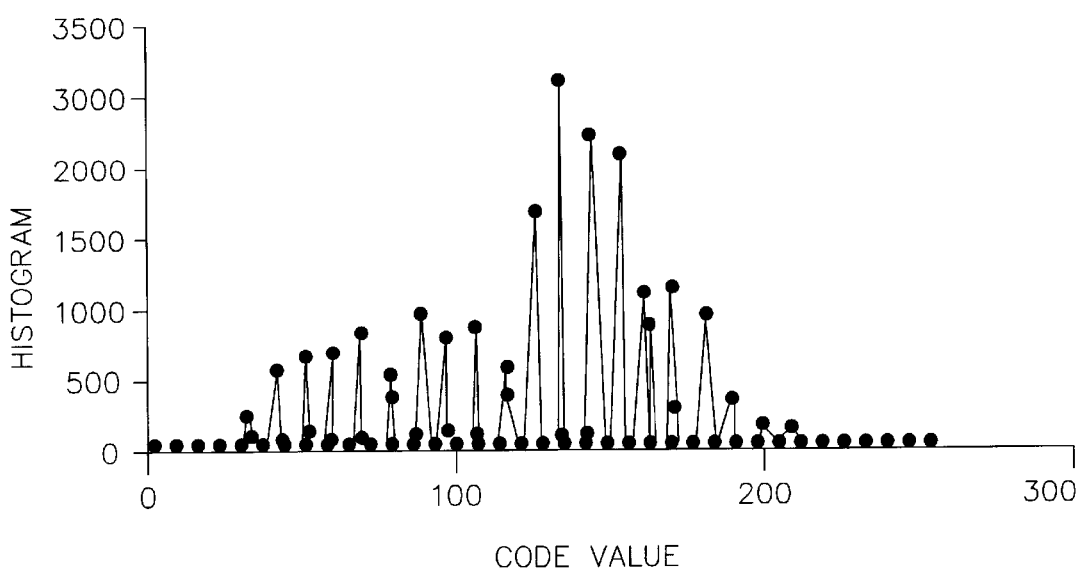
FIG. 4 shows a plot of a typical histogram of block DC values.
Figure 5:
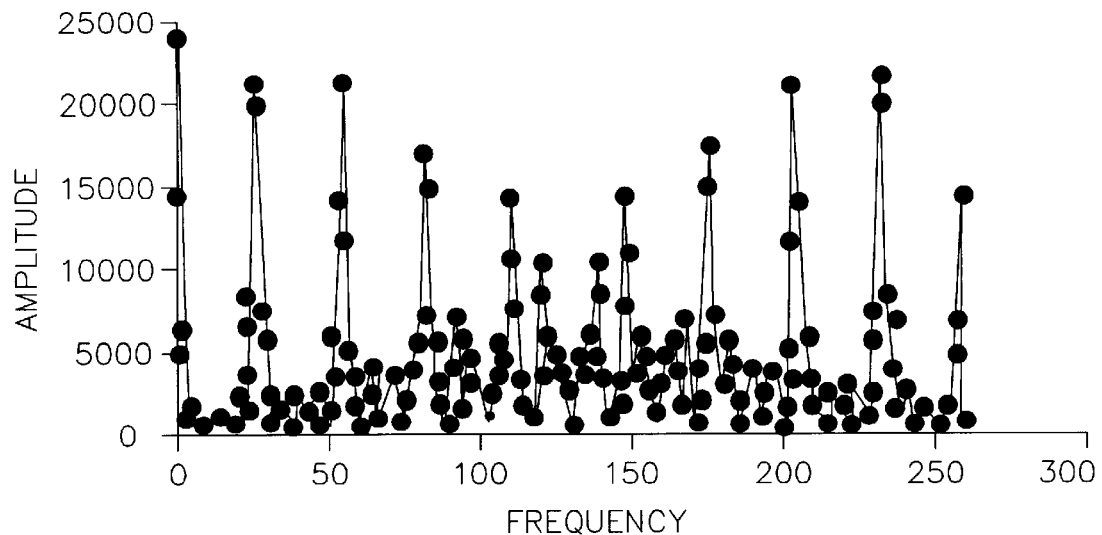
FIG. 5 shows a plot of a typical Fourier transform of the histogram of block DC values.

Referring to FIG. 2, for each image component, block size and positions are first located based on the locations of peak values of the column and row difference arrays 32. Next, the DC value of each block is calculated 34 by taking the arithmetic mean of the pixel values within each block. Then, a histogram of these block DC values is generated 36, as shown in FIG. 4. Because of the quantization of DC coefficients by JPEG, the histogram of block DC values will be sparse so that it contains only values of multiples of the DC quantization step size. In other words, the histogram is periodic. To estimate the periodicity, i.e., the quantization step size, the Fourier transform of the histogram is further calculated 38, as shown in FIG. 5. Next, the first non-DC peak of the histogram, and preferably the first non-DC peak having an amplitude greater than half the DC value, in the Fourier transform domain is identified 40. Other non-DC peaks corresponds to higher frequency harmonics (multiples of the basic periodicity). Finally, the size of the DC quantization step is calculated 42 based on the frequency of the first non-DC peak by using the following equation:

$$S=D/f_p$$

where $f_p$ is the frequency of the first non-DC peak in the Fourier transform domain, D is the length of the histogram (i.e., 256) and S is the size of the DC quantization step, which will serve as a measure of the extent of the contouring artifacts in the digital image.

Figure 6:
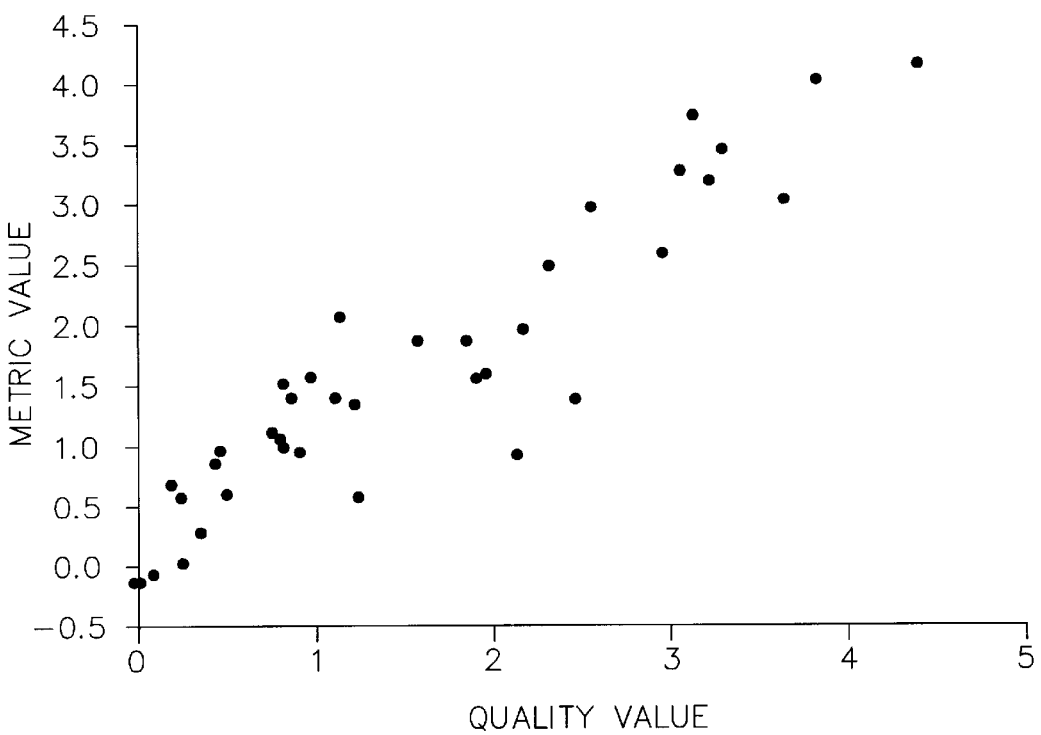
FIG. 6 shows a plot of the composite artifact measure according to the present invention against a subjective image quality ranking (in terms of severity of the JPEG artifacts: 0—no artifacts; 5—most severe artifacts).

The DC quantization step can be combined with the column and row ratios to measure the extent of blocking and contouring artifacts in a digital image. In a preferred embodiment of this invention, a composite artifact measure y is calculated using the following equation:

$$y=0.752 \times \text{MAXIMUM}(R_x,R_y)+0.281 \times S$$

where $R_x$ and $R_y$ are the column and row ratios, and S is the estimated DC quantization step size. FIG. 6 shows a plot of the composite artifact measure y against a subjective image quality ranking (in terms of severity of the JPEG artifacts: 0—no artifacts; 5—most severe artifacts) obtained through a psychophysical experiment. It is found that when y exceeds 2.0 for an image, the blocking and contouring artifacts in the image become noticeable, in which case an artifact removal algorithm is automatically applied to the compressed image to reduce the artifacts.

The invention has been described with reference to a preferred embodiment. However, it will be appreciated that variations and modifications can be effected by a person of ordinary skill in the art without departing from the scope of the invention.

PARTS LIST
10 form column difference image
12 produce column difference array
14 produce block averaged column difference array
16 locate column peak value
18 calculate column mean value
20 calculate column ratio
22 calculate the measure of the extent of blocking artifact for the image component
32 detect block boundary
34 calculate DC value for each block
36 generate a histogram for the block DC values
38 calculate the Fourier transform of the histogram
40 find the frequency value of the first non-DC peak of the Fourier transform
42 calculate the corresponding DC quantization step

What is claimed is:

1. A method of determining the extent of blocking and contouring artifacts in a digital image, comprising the steps of:
   a) forming column and row difference images;
   b) averaging the values in the columns and rows in the column and row difference images to produce column and row difference arrays;
   c) determining the extent of blocking artifacts using the column and row difference arrays;
   d) determining the extent of contouring artifacts based on an estimated DC quantization step size; and
   e) determining a composite artifact measure as a function of the extent of blocking artifacts and extent of contouring artifacts.

2. A method of determining the extent of blocking and contouring artifacts in a digital image, comprising the steps of:
   a) determining the extent of blocking artifacts in the digital image, comprising the steps of;
      i) forming a column difference image;
      ii) averaging the values in the columns in the column difference image to produce a column difference array;
      iii) computing the average of the values in the column difference array that are separated by one block width to produce a block averaged column difference array;
      iv) locating the peak value in the block averaged column difference array;
      v) calculating the mean value of the block averaged column difference array excluding the peak value to produce a column base value;
      vi) computing the ratio between the peak value and the base value to produce a column ratio;
      vii) repeating steps i)–vi) in the row direction to produce a row ratio; and;
      viii) employing the column and row ratios as a measure of the extent of blocking artifacts in the digital image;
   b) determining the extent of contouring artifacts in the digital image, comprising the steps of:
      i) locating block boundaries based on the locations of peak values of column and row difference arrays;
      ii) calculating DC value for each block;
      iii) generating a histogram of the block DC values;
      iv) calculating the Fourier transform of the histogram;
      v) locating the first non-DC peak in the Fourier transform domain; and vi) calculating an estimated DC quantization step size based on the frequency of the first non-DC peak;

vii) employing the estimated DC quantization step size as a measure of the extent of the contouring artifacts in the digital image; and c) determining a composite artifact measure as a function of the extent of blocking artifacts and extent of contouring artifacts.

3. A method of determining the extent of contouring artifacts in the digital image, comprising the steps of:

a) forming a column difference image;

b) averaging the values in the columns in the column difference image to produce a column difference array;

c) computing the average of the values in the column difference array that are separated by one block width to produce a block averaged column difference array;

d) locating the peak value in the block averaged column difference array;

e) repeating steps a)–d) in the row direction;

f) locating block boundaries based on the locations of peak values of column and row difference arrays;

g) calculating DC value for each block;

h) generating a histogram of the block DC values;

i) calculating the Fourier transform of the histogram;

j) locating the first non-DC peak in the Fourier transform domain;

k) calculating a DC quantization step size based on the frequency of the first non-DC peak; and l) employing the DC quantization step size as a measure of the extent of the contouring artifacts in the digital image.

4. The method claimed in claim 2, further comprising the step of:

a) generating an intensity gradient image;

b) calculating the standard deviation of the gradient image;

c) setting a threshold value that is twice the standard deviation; and d) in computing the average of the values in the columns and rows, excluding pixels whose gradients are larger than the threshold value.

5. The method claimed in claim 2, wherein the measure of the extent of blocking artifacts is the average of the column and row ratios.

6. The method claimed in claim 2, wherein the measure of the extent of blocking artifacts is the maximum of the column and row ratios.

7. The method claimed in claim 2, wherein the measure of the extent of blocking artifacts is a function of the column and row ratios and the column and row base values.

8. The method claimed in claim 2, wherein the measure of the extent of blocking artifacts is a look-up-table of the column and row ratios and the column and row base values.

9. The method claimed in claim 2, further comprising the steps of:

a) if the measure of the extent of blocking and contouring artifacts exceeds a predetermined threshold, determining the location of the row and column block boundaries as the locations of the column and row peak values; and b) applying an artifact removal algorithm to the image according to the location and extent of the blocking and contouring artifacts.

10. The method claimed in claim 2, wherein the composite artifact measure y is a function of the extent of blocking artifacts and extent of contouring artifacts measure of the extent of blocking artifacts, defined by:

$$y = 0.752 \times \text{MAXIMUM}(R_x, R_y) + 0.281 \times S - 1.336$$

where $R_x$ and $R_y$ are the column and row ratios, and $S$ is the estimated DC quantization step size.

11. A computer program product a computer readable storage medium having a computer program stored thereon for performing the method claimed in claim 2.

12. A computer program product a computer readable storage medium having a computer program stored thereon for performing the method claimed in claim 3.

* * * * *